March 10, 1964 H. EBERT 3,123,975
INFINITELY VARIABLE TRANSMISSION
Filed May 8, 1961 11 Sheets-Sheet 3

INVENTOR.
Heinrich Ebert
BY

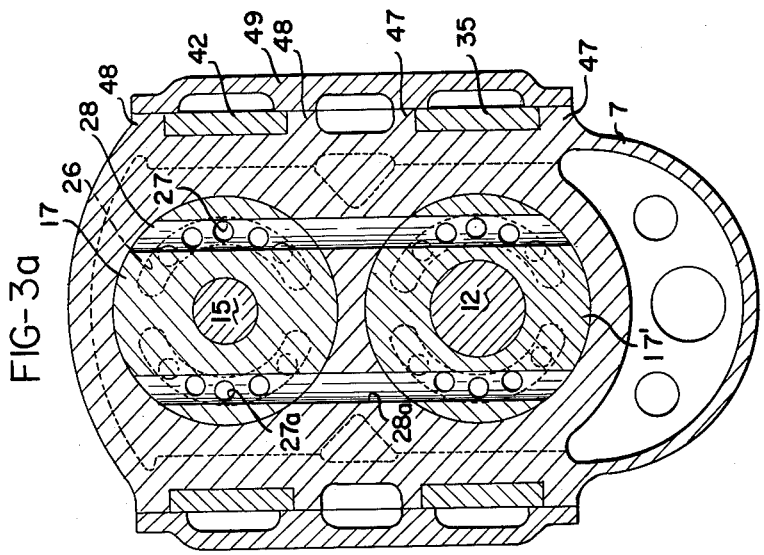

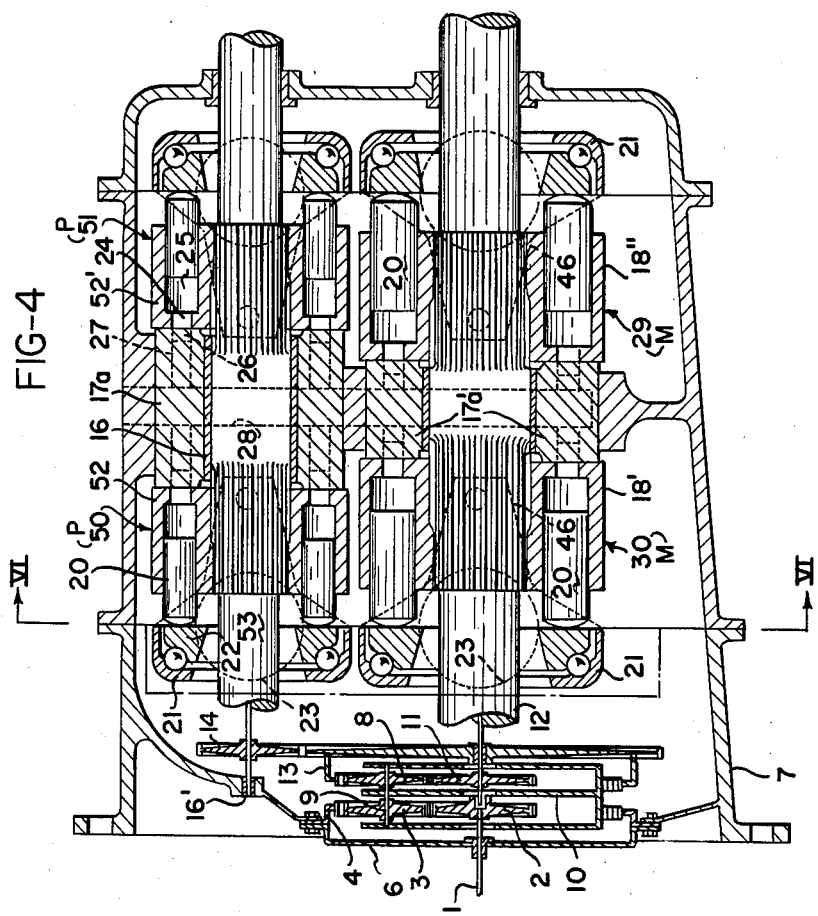

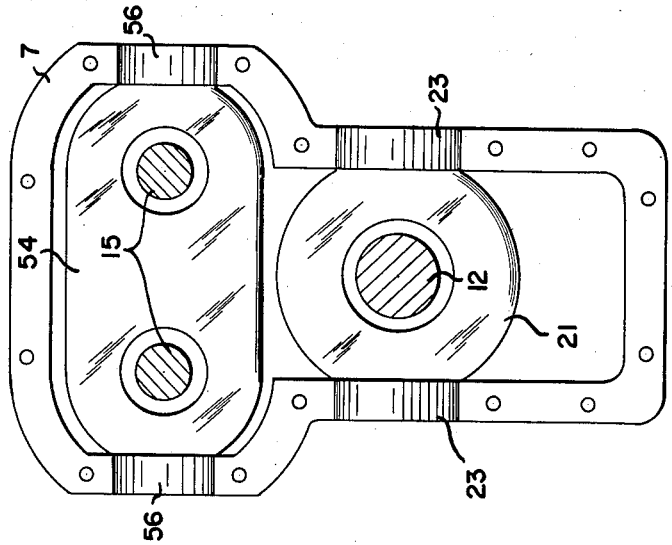
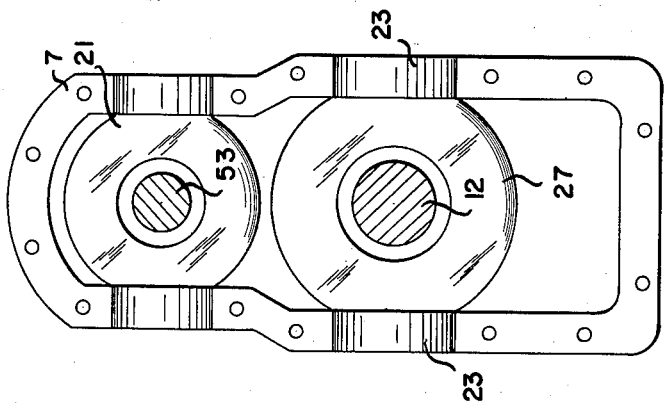
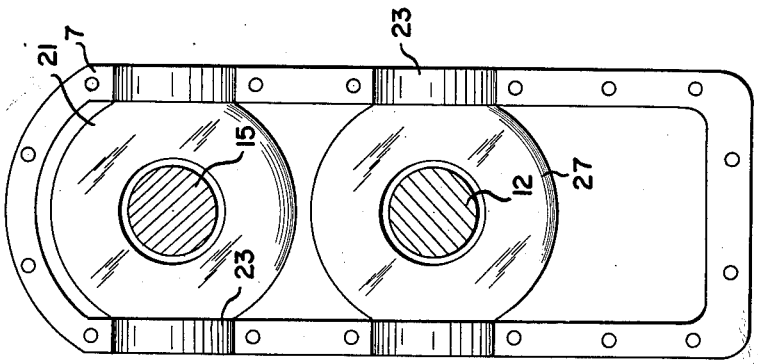

March 10, 1964     H. EBERT     3,123,975
INFINITELY VARIABLE TRANSMISSION
Filed May 8, 1961     11 Sheets-Sheet 7
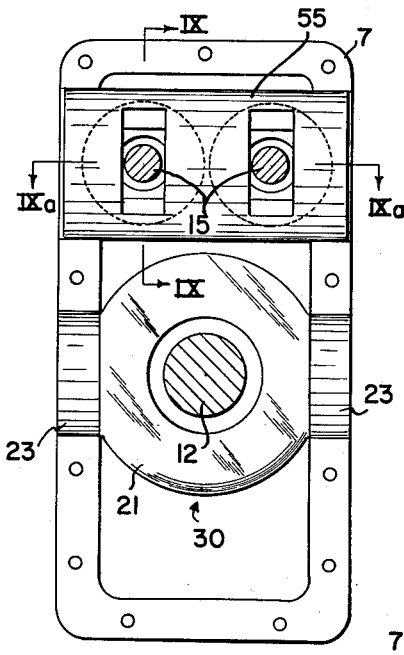
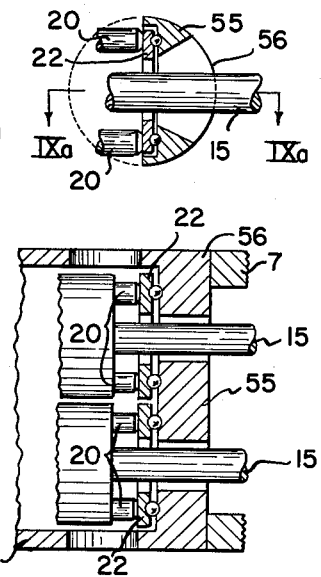
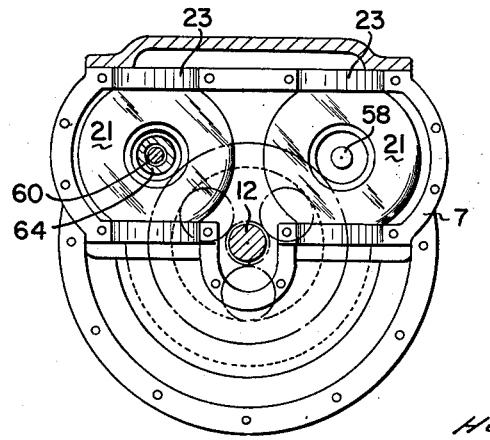
INVENTOR.
Heinrich Ebert

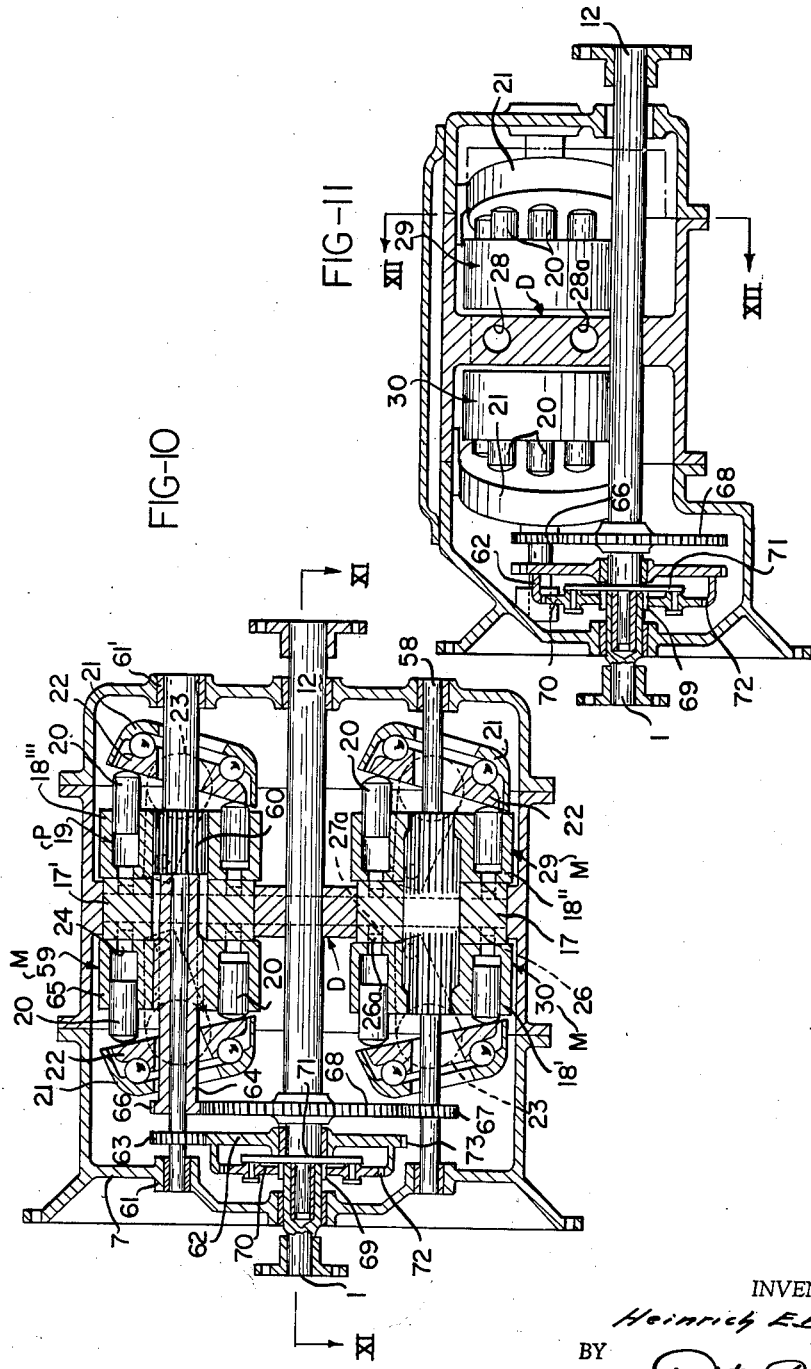

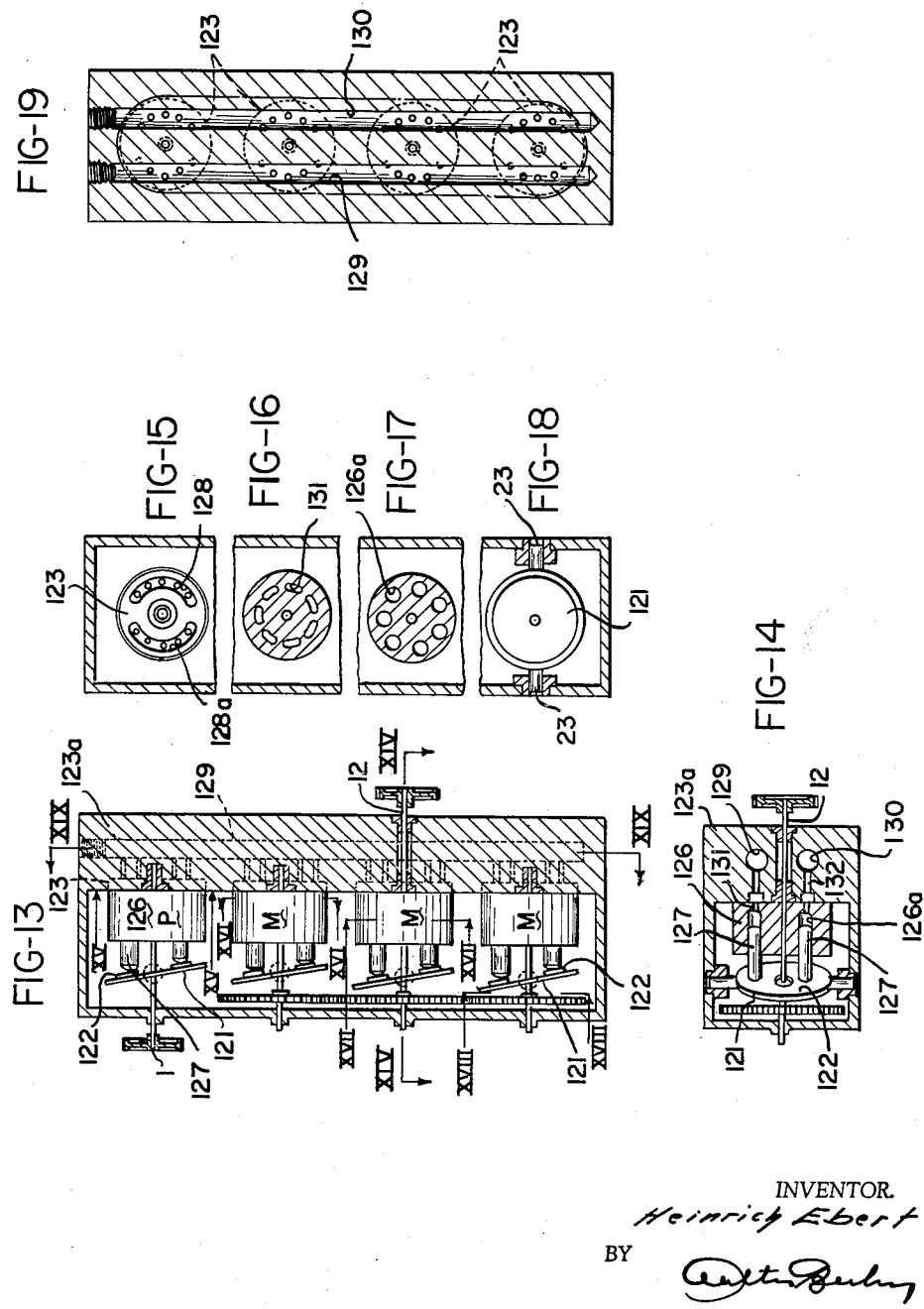

March 10, 1964  H. EBERT  3,123,975
INFINITELY VARIABLE TRANSMISSION
Filed May 8, 1961  11 Sheets-Sheet 10
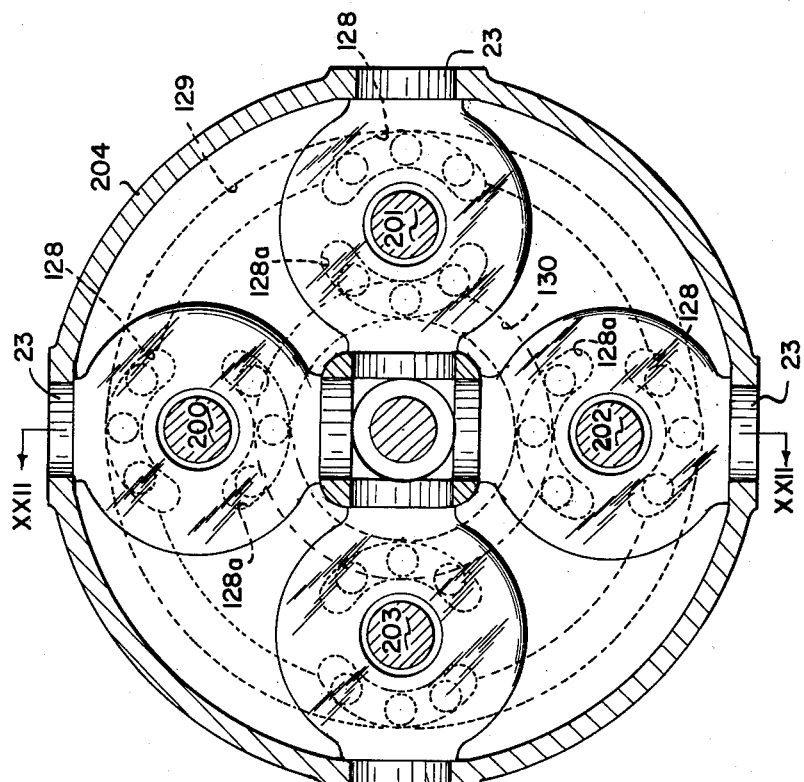
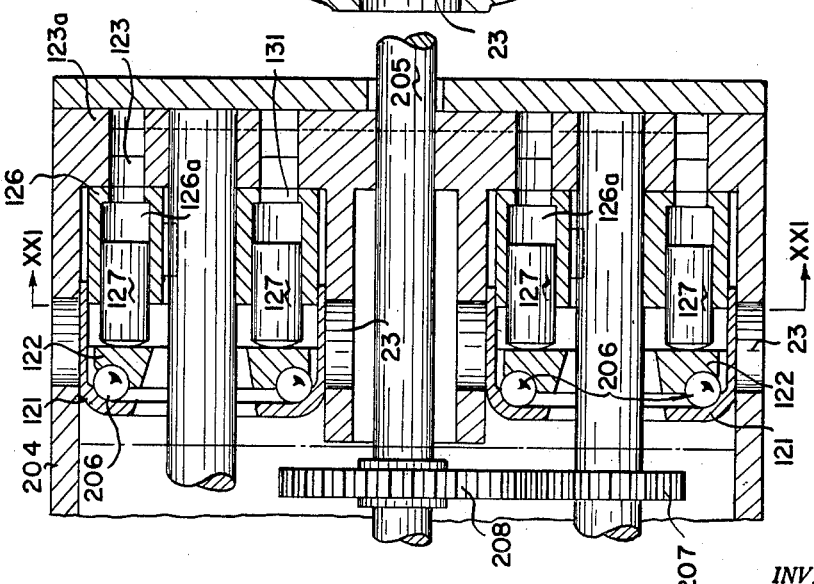
INVENTOR.
Heinrich Ebert
BY

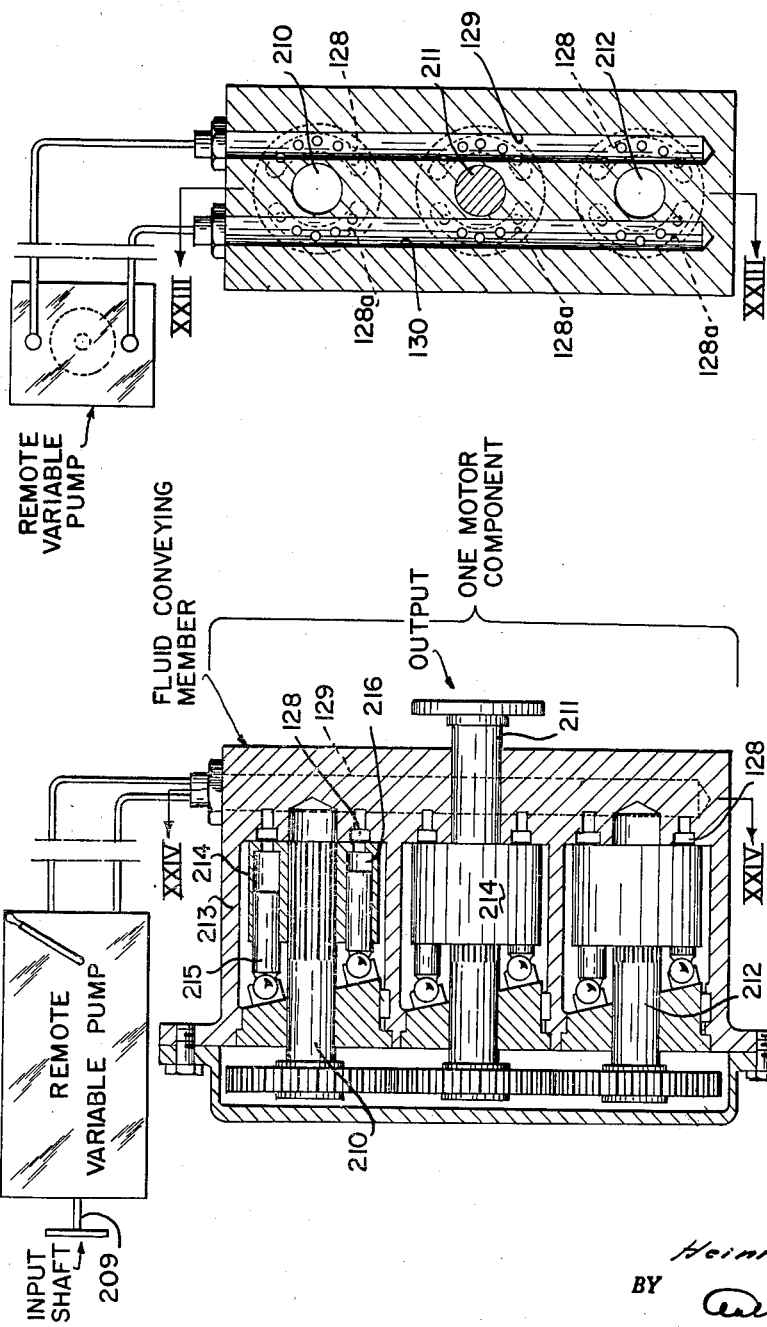

United States Patent Office

3,123,975
Patented Mar. 10, 1964

3,123,975
INFINITELY VARIABLE TRANSMISSION
Heinrich Ebert, Furth, Bavaria, Germany
Filed May 8, 1961, Ser. No. 108,349
Claims priority, application Germany Aug. 14, 1957
24 Claims. (Cl. 60—53)

The present invention relates to an infinitely variable hydraulic transmission of the axial piston type with non-tiltable cylinder blocks but with tiltable swash plates adapted to be adjusted about axes stationarily arranged with regard to the transmission housing. The present application is a continuation-in-part application of my co-pending application Ser. No. 748,708, filed July 15, 1958, now abandoned.

The present invention, although not limited to, is particularly advantageous for use in connection with transmissions for passenger cars having high speed engines. For motor vehicles of this type, transmissions are required which at maximum engine speed of approximately 5000 r.p.m. have a maximum stepdown ratio of approximately from 1:3.2 to 1:3.8. In view of the rather limited space available for the installation of such transmissions, and in view of the necessary high r.p.m.'s, it is important that the hydraulic unit and, above all, also the hydraulic motors are of relatively small dimensions because the permissible maximum sliding speed on the control valve sealing surfaces is limited. Furthermore, the centrifugal forces of the pistons and the centrifugal moments caused thereby should be as small as possible.

It has, therefore, been suggested to design the pump and motor components as double units in order to reduce the diameter of the pump and motor cylinder blocks. These units, however, were provided with tiltable cylinder blocks in order to obtain a further decrease in the diameter in view of the fact that with tiltable cylinder blocks, a greater tilting angle is possible over a unit with tiltable swash plates.

However, prior to the present invention, all efforts to obtain the desired small dimensions for the transmission failed because the obtained advantages were traded for other important drawbacks. When the tiltable cylinder blocks become sufficiently small, the tiltable housings in connection with the oil conveying lines required considerably large tilting space, and above all, the conveyance of oil from the pump to the motor becomes awkward and complicated.

It is, therefore, an object of the present invention to provide an infinitely variable hydraulic axial piston transmission which will yield a particularly compact and relatively small structure while avoiding the above outlined drawbacks.

It is another object of this invention to provide a hydraulic axial piston transmission which will make it possible to eliminate complicated transmission elements heretofore necessary between pump and motor units and between motor and output shaft.

These and other objects and advantages of the invention will appear more clearly from the following specification in connection with the accompanying drawings, in which:

FIG. 1a is a section through a portion of the control valve, said section being taken along the line Ia—Ia of FIG. 1.

FIG. 1b is a view as seen in the direction of the arrow L of FIG. 1a.

FIG. 3a is a cross section of FIG. 1 taken along the line IIIa—IIIa thereof and showing in particular the control valves and pressure and suction conduits conveying the fluid between the individual units in the common fluid conveying member.

FIG. 4 illustrates a longitudinal section through a modified transmission according to the invention with four individual units on a common fluid conveying member, always two units being coaxially arranged on opposite sides while two units form pump units and two units form motor units.

FIG. 5 is a cross section partly in view taken along the line V—V of FIG. 1 with some parts omitted for sake of clarity.

FIG. 6 is a cross section partly in view of the transmission according to FIG. 4, said section being taken along the line VI—VI of FIG. 4 with some parts omitted for sake of clarity.

FIG. 7 represents a cross section partly in view of a transmission similar to that of FIG. 1, however, with two individual pump units according to the transmission of FIG. 4 and with the pump units arranged adjacent each other instead of coaxially with regard to each other.

FIG. 8 is a view partly in section of a transmission according to FIG. 7 but with a modified supporting member.

FIG. 9 is a section taken along the line IX—IX of FIG. 8.

FIG. 9a is a section taken along the line IXa—IXa of FIGS. 8 and 9.

FIG. 10 shows a longitudinal section of a further embodiment of the invention with two coaxially arranged motor units and a third motor unit coaxial with an individual pump unit on a common fluid conveying member.

FIG. 11 illustrates a longitudinal section partly in view of the transmission according to FIG. 10, said section being taken along the line XI—XI of FIG. 10.

FIG. 12 is a cross section partially in view through the transmission according to FIG. 10, said section being taken along the line XII—XII of FIG. 11.

Figure 1:
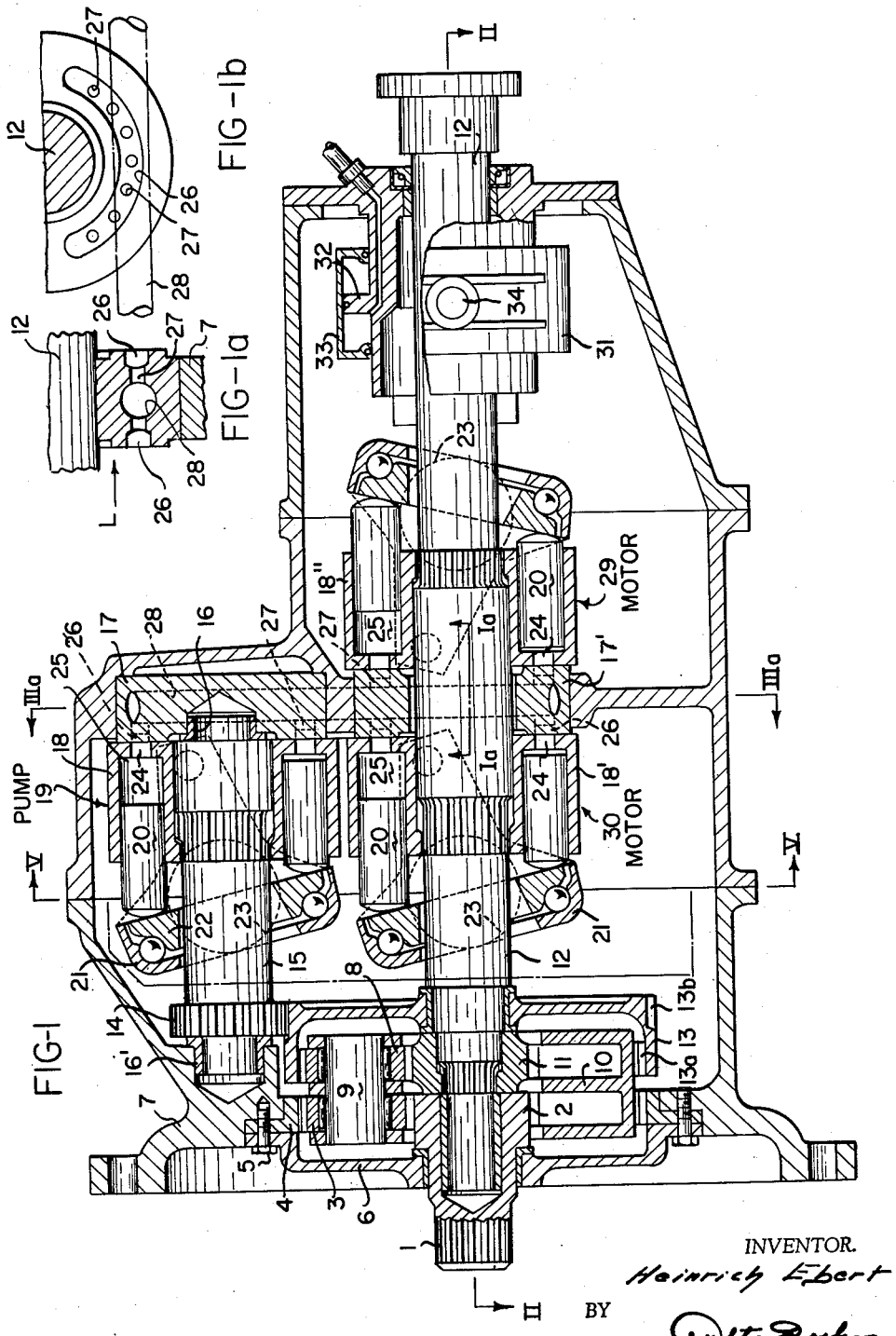
FIG. 1 illustrates a longitudinal section through a transmission according to the present invention with three units of the axial piston type arranged on a common fluid conveying member, while at least two units are arranged on one side and at least two units forming motor units are arranged coaxially to each other and are drivingly connected to the output shaft.

FIG. 13 diagrammatically shows another modification of the hydraulic transmission according to the present invention with four units on one and the same side of a common fluid conveying member, the upper one unit forming a pump unit, whereas the other three units form motor units drivingly connected to a common output shaft.

FIG. 14 is a section taken along the line XIV—XIV of FIG. 13.

FIG. 15 is a section taken along the line XV—XV of FIG. 13.

FIG. 16 is a section taken along the line XVI—XVI of FIG. 13.

FIG. 17 is a section taken along the line XVII—XVII of FIG. 13.

FIG. 18 is a section partially in view taken along the line XVIII—XVIII of FIG. 13.

FIG. 19 is a section taken along the line XIX—XIX of FIG. 13.

FIG. 20 shows a further modified transmission similar to the transmission of FIG. 4 but with six units on a common fluid conveying member, the arrangement being such that always two units are coaxial with regard to each other on opposite sides of the common fluid conveying member while two upper units are employed as pump units and the other four units are employed as motor units drivingly connected to a common output shaft.

FIG. 21 shows an arrangement with four units similar to the transmission according to FIG. 13 but with the units arranged around a common output shaft on one side of a common fluid conveying member while the upper unit operates as a pump unit and the three other units operate as motor units drivingly connected to a common output shaft, the section of FIG. 21 being taken along the line XXI—XXI of FIG. 22.

FIG. 22 is a longitudinal section of the transmission according to FIG. 21, said section being taken along the line XXII—XXII of FIG. 21.

FIGS. 23 and 24 illustrate a further embodiment of the invention in which one of the hydraulic units is remote from the others.

*General Arrangement*

The problem underlying the present invention has been realized in connection with an infinitely variable hydraulic piston transmission comprising pump and motor units of the axial piston type. Each unit comprises a shaft rotatably journalled in a transmission housing, a cylinder block drivingly connected to said shaft, swash plate means, a control valve, and a plurality of pistons axially reciprocable in cylinders of said cylinder block and acting upon swash plate means of each unit. The swash plate means of each unit may rotatably radially and axially be supported by a supporting member which in its turn may be tilted or tiltably arranged about an axis which is fixed relative to the transmission housing and is perpendicular to the axis of the shaft of the respective unit. The said control valves are fixedly connected to a fluid conveying member common to all of said control valves and communicating with the pressure conduits and suction conduits therein. The fluid conveying member is fixedly connected to the transmission housing.

By sub-dividing the motor component in a manner known per se, also with non-tiltable axial cylinder blocks, a considerable reduction in the cylinder block diameter is obtained. Moreover, by conveying the fluid through the control valves in axial direction from one common fluid conveying member, no tilting space is needed either for the cylinder blocks or for the conveyance of the fluid between the different units. The arrangement according to the invention, namely, to use such cylinder blocks the axes of which are parallel with regard to each other while the control valves of the units are arranged on one common stationary oil conveying member with pressure and suction conduits between the said control valves therein, makes possible a plurality of favorable constructions, i.e. cylinder block arrangements in which the units will be of smaller dimensions to the desired extent while at the same time the conveyance of oil between the different units will be greatly simplified in a manner not obtainable heretofore.

The working fluid is conveyed by stationary elements only and is controlled by control valves inside of the projection of the cylinder blocks onto a plane perpendicular to the axes of the cylinder blocks only. In this way, the arrangement and the dimensions of the conduits will be particularly simple.

According to a further development of the invention, at least two units of the motor component with common oil supply through control valves on both sides of the common fluid conveying member, are coaxially arranged with regard to each other upon a common shaft or two axially aligned shafts. This common shaft or these shafts may be represented by the output shaft to which the coaxially arranged units are drivingly connected. By such an arrangement, the otherwise necessary transmission elements between the motor and the output shaft become superfluous. Due to the axial operating control valves on both sides of the common fluid conveying member provided between the two cylinder blocks, the oil supply is structurally further simplified, and its operation is assured even better.

According to a further development of the invention, also the pump may be replaced by two smaller units which, similar to the motor units, depending on the respective conditions of installation, may either be arranged on parallel shafts adjacent to each other with their control valves on one and the same side of the common fluid conveying member, or the two pump units may be provided with coaxial cylinder blocks and their respective control valves on opposite sides of the common fluid conveying member, or the said two shafts connected to a common shaft or two axially aligned shafts drivingly connected to each other. Thus, the common shaft may be represented by the input shaft. It is well known to have hydraulic axial piston transmissions work together with a planetary gear transmission or a double planetary gear transmission, whereby the dimensions of the units can likewise be reduced. The planetary gear transmission directly mechanically transmits a portion of the power to be transmitted, while the other portion is transmitted to the output shaft through the hydrostatic transmission component. The advantage of such an arrangement is seen in that the input torque is transmitted directly mechanically to the output shaft regardless of the respective stepdown ratio. Therefore, at low ratios, the additional torque only has to be transmitted from the hydraulic transmission to the output shaft. Thus, for example, with a stepdown ratio of 1:3.2 or 1:3.8, the torque to be conveyed by the hydraulic transmission will not have to be 3.2 or 3.8 times as high as with the stepdown ratio of 1:1 but only 2.2 or 2.8 times as high with a stepdown ratio of 1:1.

Inasmuch as the power split-up is particularly advantageous in connection with the problem underlying the present invention, some of the embodiments shown in the drawings of the arrangement according to the invention are provided with a preceding power dividing planetary gear transmission, while some other embodiments are shown without power division.

*Structural Arrangement*

Referring now to the drawings in detail, the hydrostatic transmissions illustrated in FIGS. 1, 2, 3, 4 and 20 are preceded by power dividing planetary gear transmissions of the same type, the drive being effected through the intervention of a drive shaft 1 with a pinion 2 meshing with the planetary gears 3 which latter mesh with the inner teeth of a gear 4. The gear 4 is by means of screws 5 (shown only in FIG. 1) connected to a bearing and closure lid 6 of the transmission housing 7. The planetary gears 3 of the first planetary gear system 2, 3, 4 are similarly to but independently of the planetary gears 8 of the second planetary gear system 11, 8 and 13 rotatably mounted on studs 9 in a planetary gear wheel carrier 10 common to said two planetary gear systems. The planetary gears 8 are provided with teeth meshing with a sun gear 11 which is keyed to an output shaft 12 of the transmission. The teeth of the planetary gears 8 furthermore mesh with the inner teeth 13a of gear 13 which latter is journalled on the output shaft 12 so as to be rotatable relative thereto. Gear 13 is additionally provided with outer teeth 13b meshing with gear 14.

The two planetary gear systems are coaxially arranged with regard to each other and are also coaxially arranged with the input shaft 1 and output shaft 12. While the first gear system establishes a fixed transmission ratio between the gear wheel carrier and the input shaft, the second gear system operates with regard to the speed ratio between the output shaft 12 and gear 14 in the manner of a differential gear transmission in such a way that at a standstill of the output shaft, the gear 14 turns, for instance, at input shaft speed, and inversely at a standstill of gear 14, the output shaft turns at input shaft speed.

This differential effect is generally such that the total of output shaft speed and speed of gear 14 always equals the speed of the input shaft.

When at a constant torque and speed of the input shaft, for instance, the torque effected thereby from the input shaft to the output shaft is the same, independently of the speed ratio between output shaft and input shaft, the power transmitted from the intput shaft to the output shaft in a purely mechanical way will as a product of torque times speed thus be proportional to the speed of the output shaft. In other words, the percentage of input shaft power transmitted purely mechanically to the output shaft by way of the planetary gear transmission will at a ratio of output shaft speed to input shaft speed of 1:1, be 100%, whereas at a ratio of output shaft speed to input shaft speed of 1:2, it will amount to only 50% of the input shaft power transmitted. The remainder has to be transmitted to the output shaft by the hydraulic component of the transmission via gear 14 to a hydraulic pump and hydraulic motor system according to the invention.

With reference to the transmission according to FIGS. 1, 2, 3 and 3a, the structure shown therein represents a transmission with three units 19, 29 and 30 of the axial piston type. All of said units are of identical size. Each unit comprises shaft means 12, 15 journalled rotatably relative to the transmission housing 7, a swash plate 22, a cylinder block 18, 18' and 18'', and a control valve 17, 17'. Each cylinder block is provided with a plurality of cylinders 25 extending in axial direction of the cylinder block. Said cylinders have reciprocably mounted therein pistons 20 respectively acting upon swash plates 22. The swash plates are rotatably radially and axially supported by anti-friction bearings which are mounted on supporting members 21. The supporting members 21 are tiltably supported by pivots 23 mounted in the transmission housing. The axes of said pivots 23 are stationarily arranged with regard to the transmission housing 7 and are perpendicular to the axis of the respective cylinder block pertaining thereto. The control side of the cylinder blocks are in customary manner provided with passages 24 through which the cylinders 25 in said cylinder blocks in axial direction of the latter, communicate with kidney-shaped cavities 26, known per se, of the control valve controlling the oil flow to and from the respective cylinders. In other words, the flow of fluid from the control valve to the cylinders and from the cylinders to the control valve is effected in axial direction of the cylinder blocks.

The control valves are firmly connected to a wall of the transmission housing, for instance, pressed into said wall. The said control valves as well as said wall of the housing are provided with bores 28 and 28a (see FIGS. 1, 2 and 3a). These bores represent the pressure conduit means and suction conduit means of the so-called fluid conveying member. It is, however, to be understood that the fluid conveying member may also be designed as a separate member fixedly connected to the housing, or a part of the fluid conveying member may be formed by the housing itself, while the other part of the fluid conveying member is formed by a separate member fixedly connected to the housing. The cylinder blocks 18, 18' of the units 19 and 30 have their control valve sealing surface arranged on one and the same side of the common fluid conveying member, whereas the cylinder block 18'' of the unit 29 with its control valve sealing surface is arranged on the other side of said common fluid conveying member but is coaxial with regard to the unit 30, and its control valve sealing surface is located opposite to that of the unit 30.

Shaft 15 is rotatably journalled in bearings 16 and 16' of the transmission housing and of the control valve 17 and is driven by gear 14 connected thereto. The cylinder block 18 of the unit 19 is connected to shaft 15 so as to be rotatable therewith. This means that the cylinder block 18 of the unit 19 is, regardless of the differential effect, actually drivingly connected to the input shaft 1 and operates as a pump cylinder block. Both the cylinder blocks 18' and 18'' of the units 29 and 30 are directly connected to a common shaft 12. Consequently, these two cylinder blocks 18' and 18'' rotate together with shaft 12 and act as cylinder blocks of motor units.

Figure 2:
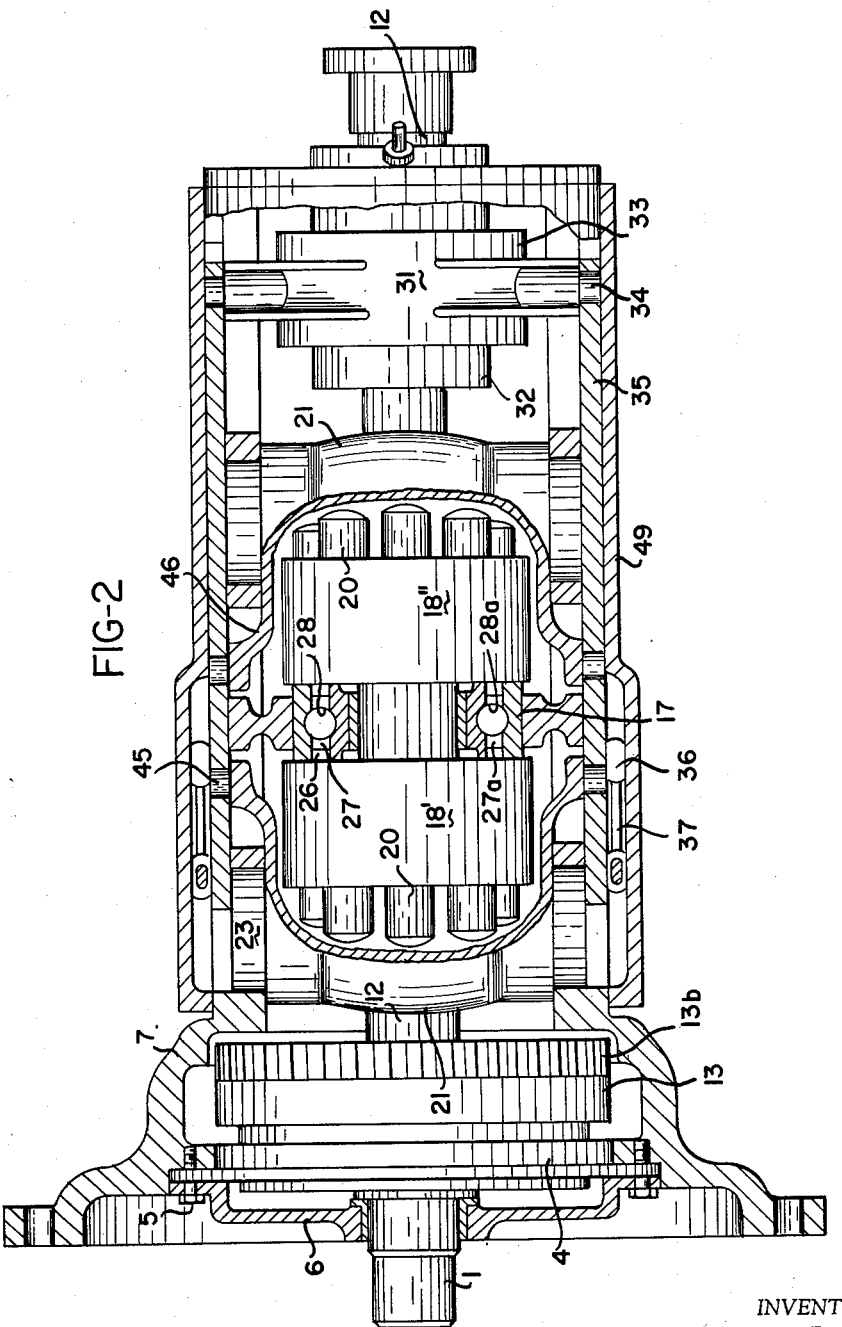
FIG. 2 represents a top view and partial section of the transmission shown in FIG. 1, said section being taken along the line II—II of FIG. 1.
Figure 3:
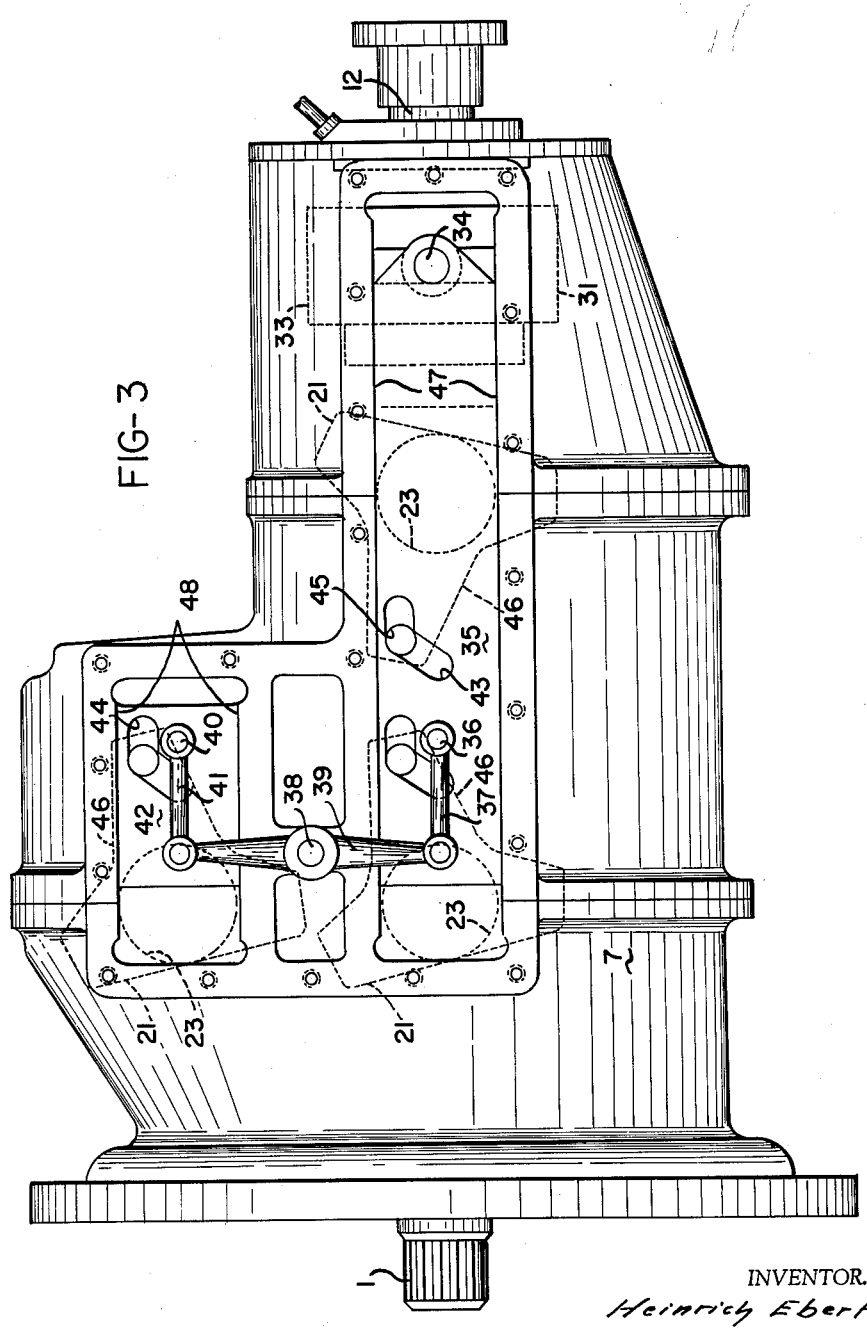
FIG. 3 is a side view of the transmission according to FIG. 1 with the lateral lids removed in order more clearly to illustrate the adjusting mechanism.

The shafts of all units are arranged parallel to each other. The sealing surfaces of all control valves are arranged in planes parallel to each other and perpendicular to the axes of the unit shafts. One kidney-shaped cavity 26 of each control valve communicates through bores 27 with the pressure conduit bore 28 while the other kidney-shaped cavity of each control valve communicates through bores 27a with the suction conduit bore 28a (see FIGS. 2 and 3a). The cavities of all control valves and the pressure and suction conduit bores which convey the fluid between all of the cylinder blocks are located within the axial projection of the shortest enveloping contour line around all of the cylinder blocks of units 19 and 30 on a plane perpendicular to the axes of all the cylinder blocks (FIG. 3a). The adjustment of the swash plates of the pump and motor units for a desired speed ratio of the transmission is effected hydraulically through a hydraulic servomotor 31 coaxially arranged, for instance, with the transmission output shaft 12. Servomotor 31 comprises a piston 32 and a cylinder 33. Studs 34 connected to cylinder 33 extend into slides 35 (FIG. 3) which are axially displaceable for actuating the tilting of the motor swash plate supporting members 21. Slides 35 are furthermore connected to a tiltably journalled transverse lever 39 through pivots 36 and crank drive 37. Lever 39 is tiltably journalled on pivot 38 of the transmission housing 7. The lever 39 is furthermore kinematically connected by pivots 40 and crank drive 41 to slides 42 for actuating the tilting of the pump swash plate supporting members. The arrangement is such that a movement of the slides 35 toward the right with regard to the drawing, brings about a displacement of the slides 42 toward the left, and vice versa. In addition thereto, the slides 35 and 42 are provided with slots 43 and 44 engaged by studs 45 which latter are mounted on arms 46 of the tiltable supporting members 21. The swash plate adjustment assures a simultaneous adjustment of the pump swash plates and of the motor swash plates in an extremely simple manner. The slides 35 and 42 are guided in guiding means 47 and 48 of the transmission housing 7 and are supported by the screwed-on closure member 49 (FIGS. 2 and 3a).

Referring now to the hydraulic embodiment of the transmission according to FIG. 4, the structure shown therein represents a transmission with four units of the same axial piston type as used in the embodiment of FIG. 1. The pump unit 19 of FIG. 1 has been replaced by two smaller pump units 50 and 51 the cylinder blocks 52 and 52' of which are connected to the shaft 53 common thereto, said blocks 52 and 52' being coaxial to each other. The cylinder blocks 52, 52' have their control valve sealing surfaces, arranged in the manner of that of the cylinder blocks 18' and 18'' of the units 29 and 30, said control valve sealing surfaces being arranged coaxially to each other and on opposite sides of the so-called fluid conveying member common thereto. This fluid conveying member consists, in this instance, of the double-faced control valves 17a between the cylinder blocks 52 and 52' of the pumps 50 and 51 and furthermore of the double control valves 17a' between the cylinder blocks 18' and 18'' of the motors 29 and 30. The valves 17a and 17a' of pumps 50 and 51 and of the motors 29 and 30, respectively are pressed into a wall of the transmission housing 7. These valves 17a, 17a' as well as the wall of the housing have arranged therein the pressure and suction conduit bores 28 and 28a. The respective cylinders of the cylinder blocks 52, 52' of the pumps 50 and 51 as well as the respective cylinders of the cylinder blocks 18', 18'' of motors 29 and 30 are on the pressure side as well as on the suction side in hydraulic communication with the bores 28 and 28a respectively and are controlled in the same manner as the cylinders of the cylinder blocks of the embodiment shown in FIG. 1.

All other parts of the arrangement shown in FIG. 4 correspond to those of FIG. 1 and are similarly arranged.

The adjustment of the desired speed ratio of the transmission is effected in the same way as described above in connection with FIG. 1 by adjusting the arms 46 of the supporting members 21.

As will be obvious from FIG. 6, this arrangement brings about a further reduction in the cross sectional area required for installation of the units as will be particularly evident by a comparison of FIG. 6 with FIG. 5.

With two individual units arranged adjacent each other and drivingly connected to a drive shaft, and with coaxially arranged motor units in a transmission according to FIG. 1, the cross sectional areas for the installation of the units will be those illustrated in FIGS. 7 and 8, respectively.

According to a further development of the present invention in connection with the above mentioned arrangement, it is suggested rotatably to journal the swash plates 22, which are arranged adjacent each other, in a single common supporting member 54 (FIG. 7) or 55 (FIGS. 8, 9, 9a). The pivots 56 of FIG. 7 tiltably support the swash plate supporting member 54 in the transmission housing. Such an arrangement brings about a reduction in the width, especially if the diameter of the supporting pivot 56 is greater than the diameter of the swash plates 22 as shown, for instance, in FIGS. 8, 9, 9a. This is possible without difficulty in view of the small dimensions of the double pump cylinder blocks arranged adjacent each other, as shown in FIGS. 8, 9, 9a.

Depending on the particular conditions of installation in each instance, each of the various arrangements described above may be advantageous.

The arrangements according to FIGS. 5, 7 and 8 require a wider upper cross sectional area at a shorter length, whereas the arrangement according to FIG. 6 requires a smaller upper cross sectional area at a longer length.

Referring now to the embodiment of the transmission according to FIG. 20, the construction diagrammatically shown therein represents a transmission with six units of the same axial piston type as used in the foregoing described examples. Three cylinder blocks of these units are arranged on the left-hand side of the common fluid conveying member and three cylinder blocks are arranged on the right-hand side of said common fluid conveying member. It should be noted that always two cylinder blocks are arranged coaxially with regard to each other on opposite sides of said common fluid conveying member and are also drivingly connected to coaxially arranged shaft means common thereto. All of the shafts are parallel to each other. All of the sealing surfaces of the control valves are located in planes parallel to each other and perpendicular to the shafts of the units. Two oppositely located and coaxially arranged cylinder blocks are drivingly connected to gear 14 of the double planetary gear transmission while two other oppositely located coaxially arranged cylinder blocks are directly drivingly connected to the output shaft 12. Two further oppositely located coaxially arranged cylinder blocks are drivingly connected to a common shaft which in turn is drivingly connected by means of gears to the output shaft 12.

Referring now to FIGS. 10, 11 and 12, the structure shown therein represents a transmission with four units 19, 29, 30 and 59 of the above described axial piston type on one common fluid conveying member D and a modified preceding power dividing gear system. The cylinder block 18''' of unit 19 is splined to a shaft 60 rotatably journalled in bearings 61, 61' of the housing 7. The cylinder block 65 of the unit 59 is splined to a hollow shaft 64 and coaxially arranged with regard to cylinder block 18''' of unit 19. Hollow shaft 64 is rotatably journalled on shaft 60. The cylinder blocks of the units 29 and 30 are splined to one common shaft 58 rotatably journalled in bearings of housing 7. The cylinder blocks of the units 29 and 30 as well as the cylinder blocks 18''' and 65 of the units 19 and 59 are arranged on both sides of the common fluid conveying member D. The cylinders of the cylinder blocks of the units 29 and 30 are controlled by the double-faced stationary controlled valve 17. The cylinders of the cylinder blocks 18''' and 65 are controlled by the double-faced stationary control valve 17'. Both control valves are provided on each control surface with two kidney-shaped cavities 26 and 26a respectively for controlling the oil flow in axial direction to and from the cylinders in the cylinder blocks through passage 24.

The respective cavities of these valves communicate with each other on the pressure side as well as on the suction side through bores 27, 28 and 27a, 28a, respectively. These bores are provided in the stationary control valves 17 and 17' pressed into a wall of housing 7, while the bores 28, 28a are additionally provided in the said wall of the housing. All of these bores are contained in the common fluid conveying member D. The sealing or control surfaces of all control valves are arranged in planes parallel to each other and perpendicular to the shafts of the units. The shafts of the units are arranged parallel to each other. The shafts of the units 29, 30 and 59 operating as motors are drivingly connected to the output shaft 12 by means of the gears 66, 67 and 68 keyed to their respective shafts. The shaft 60 is drivingly connected to the input shaft 1 by means of the gear 63 keyed to shaft 60 and meshing with the teeth 73 of the gear wheel 62 as a part of the single stage planetary gear transmission. This transmission consists of the sun gear 69 connected to the input shaft 1 (FIGS. 10, 11), the planetary gear wheels 70 on the planetary gear carrier 71 fixedly connected to the output shaft 12, and the gear wheel 62 rotatably journalled on the output shaft 12. The wheel 62 has its inner teeth 72 (FIG. 11) in mesh with the teeth of the planetary gear wheels 70. In this way, the planetary gear transmission is causing a differential effect between the pump unit shaft 60 and the motor unit shafts 64, 58 in the same manner as the second gear system of the planetary gear transmission of the embodiment of FIG. 1, for instance, so that here the total of the speeds of a pump unit shaft and a motor unit shaft 64 or 58 will always be constant. All other parts of the arrangement correspond to those of the embodiment according to FIG. 1.

The adjustment of the desired transmission speed ratio output shaft: input shaft may be effected in the same way (not specifically shown in the drawing) as described above by tiltably adjusting the arms 46, shown in dotted lines only, of the supporting members 21.

The transmissions diagrammatically illustrated in FIGS. 13 to 19, 21 and 22 are transmissions according to the invention without power divider. With this arrangement, the power is transmitted from the input shaft to the output shaft in a purely hydraulic manner.

All of these transmissions have, for instance, four units of the axial piston type as described above, and are arranged with their control valves on one and the same side of the common fluid conveying member. For instance, three units are employed as motor units and are drivingly connected to the output shaft, whereas the fourth unit is drivingly connected to the input shaft. All cylinder blocks of said units are rotating as cylinder blocks of individual units with their shafts arranged parallel to each other. The arrangement is such that the individual units are by means of their respective control valves controlled and sealed along a stationary fluid conveying member common thereto and containing the pressure and suction oil conduits. This arrangement yields particularly short constructions, especially if all hydraulic units are as shown arranged on one and the same side of the common oil conveying member.

Referring now more specifically to the embodiment shown diagrammatically in FIGS. 13 to 19, there are four units of the axial piston type each one of which comprises a shaft rotatably journalled in the transmission housing, a cylinder block 126 connected thereto, a swash plate 122, a control valve 123, and a plurality of pistons 127 axially reciprocable in cylinder 126a (FIGS. 14, 17) of the cylinder blocks 126 and acting upon the swash plate of the respective unit. The shafts of all cylinder blocks 126 are arranged parallel to each other in one single plane. The swash plate 122 (FIG. 14) of each unit is rotatably supported by a member 121 tiltable around an axis perpendicular to the shaft axis and parallel to the respective axis of the other units and stationary with regard to the transmission housing. Each control valve is stationarily arranged on one and the same side only of one common fluid conveying member 123a which is fixedly connected to the transmission housing. Control valves of this general type are known per se and are provided with sealing surfaces. The sealing surfaces of all control valves are located in a plane perpendicular to the shaft axes of the individual units. Each control valve has two kidney-shaped cavities 128 and 128a as they are shown in FIG. 15. One cavity of each control valve communicates with a stationary pressure conduit 129 forming a straight bore (see FIGS. 13, 14 and 19), whereas the other cavity of each control valve communicates with a stationary suction conduit 130 forming a straight bore (see FIGS. 13, 14 and 19). Both cavities control the oil flow in axial direction to and from the respective cylinder blocks through passage 131 (see FIG. 16) pertaining to each cylinder in the respective cylinder block. The conduits 129 and 130 in the common fluid conveying members 123a as well as the cavities 128 and 128a projected in axial direction are arranged within the projected area confined by the projection of the shortest enveloping line of all cylinder blocks in axial direction thereof.

The uppermost cylinder block in FIG. 13 is directly connected to the input shaft 1 while shafts of two other cylinder blocks are drivingly connected to the output shaft 12 by means of the gear wheels keyed thereto and to the output shaft. The fourth cylinder block is directly keyed to the output shaft. The adjustment for varying the speed ratio of these transmissions may be effected by tilting the supporting members in a similar way, as described above in connection with the transmission of FIG. 1.

Referring now to the embodiment shown in FIGS. 21 and 22, there are similar to the embodiment of FIGS. 13 to 19 also provided four units of the axial piston type. Each of these units comprises a shaft 200, 201, 202, 203 rotatably journalled in the transmission housing 204, a cylinder block 126 connected thereto, a swash plate 122, a control valve 123 and a plurality of pistons 127 axially reciprocable in cylinder 126a (FIG. 22) of the cylinder blocks 126 and acting upon the swash plate of the respective unit. The shafts of the cylinder blocks 126 are arranged parallel to each other around an output shaft 205 along a cylindrical surface. The swash plate of each unit is rotatably supported by an antifriction bearing 206 and a supporting member 121 tiltable around an axis perpendicular to the shaft axis but radially to the output shaft and stationary with regard to fluid conveying member 123a fixedly connected to the transmission housing 204. Each control valve is stationarily arranged on one and the same side only of this common fluid conveying member 123a as a part thereof. The sealing surfaces of all control valves are located in a plane perpendicular to the shaft axes of the individual units. Each control valve has two kidney-shaped cavities 128 and 128a of the type shown in FIG. 15. One cavity of each control valve communicates with a stationary pressure conduit 129, whereas the other cavity of each control valve communicates with a stationary suction conduit 130. The pressure conduit as well as the suction conduit are arranged circularly and concentrically with regard to each other in the common fluid conveying member. Both cavities control the oil flow in axial direction to and from the respective cylinder blocks through passages 131 (see FIG. 22) respectively pertaining to each cylinder in the respective cylinder block. The cavities 128 and 128a as well as at least the inner circular conduit projected in axial direction are located within the projected area which is obtained by projecting the circular circumferential line of all cylinder blocks in axial direction thereof.

The uppermost cylinder block is directly connected to the input shaft 1 while the shafts of the three other cylinder blocks are drivingly connected to the output shaft 205 by means of the pinions 207 and gear 208 keyed to said output shaft.

The adjustment for varying the speed ratio of these transmissions may be effected by tilting the supporting members in a similar way as described above in connection with the transmission of FIG. 1.

The invention also includes an arrangement according to which two or more hydraulic units of the axial piston type, for instance motors, are arranged on one and the same side of a common fluid conveying member and are drivingly connected to a common rotatable shaft, whereas one or more hydraulic units of the type involved, in this example pump units, are remotely arranged with regard to and hydraulically connected with said first mentioned units.

It will be understood that particularly in the last mentioned arrangement without power dividing transmission, at least one motor unit may be provided with a swash plate supported by a supporting member fixed relative to the transmission housing.

Similarly, at least two units arranged on one and the same side of a common fluid conveying member and drivingly connected to a common shaft may, in conformity with the present invention, be arranged as motor units alone or as pump units alone, so that this common shaft may be an input shaft driving pump units, or may be an output shaft driven by motor units. In the same way, the swash plates may be tiltable or may be arranged at a fixed angle to the sealing surface of the control valves or to the plane perpendicular to the shafts of such unit, as shown in FIGS. 23 and 24.

The arrangement according to FIGS. 23 and 24 comprises an input shaft 209 connected in any convenient manner to a variable pump of any type with pressure and suction conduits to the motor components.

The motor component of FIGS. 23 and 24 consists, in conformity with the invention, of three motor units of the axial piston type, each comprising a shaft 210, 211, 212 rotatably journalled in the transmission housing 213, a cylinder block 214 splined thereto, a fixed supporting member, control valve means, and a plurality of pistons 215 axially reciprocable in cylinders 216 of the cylinder blocks 214 and acting by means of shoes directly upon said supporting member of the respective unit, said shoes being linked in a spherical manner to the respective pistons. The shafts of all three motor cylinder blocks are arranged parallel to each other in one plane. The supporting members of each unit are screwed to the housing (not shown) so as not to be rotatable and are provided with an inclined surface toward the respective piston on which the piston shoes slide so that the pistons, during the rotation of the respective cylinder block, will reciprocate.

The respective control valve means are designed in the same manner as the transmission according to FIG. 13, and a part of the common fluid conveying member is, similarly to FIG. 13, arranged on one and the same side only of the one common fluid conveying member. The cylinder surfaces of all control valve means are located in a plane perpendicular to the shaft axes of the individual units. Each control valve has two kidney-shaped cavities 128 and 128a as they are shown in FIG. 15. One cavity of each control valve communicates with the stationary pressure conduit 129 forming a straight bore (FIG. 24) whereas the other cavity of each control valve communicates with the stationary suction conduit 130 also forming a straight bore. Both cavities control the oil flow in axial direction to and from the respective cylinder blocks through passages pertaining to each cylinder in the respective cylinder block. The shafts of two motor units are drivingly connected to the output shaft 12 by means of gear wheels keyed thereto and to the output shaft, whereas the third motor cylinder block is splined directly to the output shaft.

The present invention will yield transmissions or transmission components which, due to the small diameter of their cylinder blocks in combination with their simple space saving fluid confining member, will have surprisingly small cross-sectional areas for the installation, as is required for the employment of such transmissions in motor vehicles, especially passenger cars if such hydrostatic transmissions, due to their particular advantages, are to be used instead of the heretofore known change transmissions. The numerous possibilities of combinations in the arrangement of the individual units according to the present invention make it possible to adapt the diameter of the transmission housing as well as the axial extension thereof to the respective requirements.

It is, of course, to be understood, that the present invention is, by no means, limited to the particular constructions shown in the drawings but also comprises any modifications within the scope of the appended claims.

What I claim is:

1. In a hydrostatic transmission with swash plate operated pistons, a fluid conveying member having pressure fluid and suction fluid conveying means and also including control valve means associated with said pressure fluid and suction fluid conveying means, at least three hydraulic units of the axial piston type arranged on one and the same side of said one fluid conveying member, each one of said units having a swash plate and also having a cylinder block rotatable relative to said fluid conveying member and provided with a plurality of cylinders extending substantially in the direction of the axes of rotation of said cylinder blocks, said cylinder blocks engaging said fluid conveying member and said cylinders registering with said control valve means as said cylinder blocks rotate, the axes of rotation of said cylinder blocks being substantially parallel to each other, a plurality of pistons respectively reciprocable in said cylinders and acting upon the respective swash plate, the plane of each of said swash plates in each respective angular position thereof remaining stationary relative to said fluid conveying member while the respective unit operates at the respective angular position of the respective swash plate, conduit means extending in axial direction of said cylinders, said control valve means being operable in response to the rotation of said cylinder blocks to alternately connect said cylinders of said cylinder blocks with said pressure fluid and said suction fluid conveying means respectively along planes parallel to each other and perpendicular to the axes of said cylinder blocks thereby to connect said units in closed circuit, said conduit means and said control valve means and at least a portion of said pressure and suction fluid conveying means being located within the projection of said cylinders on said fluid conveying member, said projection being confined by the projection of the shortest enveloping contour line around all of said cylinder blocks onto said fluid conveying member, a housing surrounding said transmission, input shaft means rotatably journalled in said housing and drivingly connected to at least one cylinder block, output shaft means drivingly connected to the other cylinder blocks, the unit pertaining to said one block constituting a pumping unit, and the remainder of said units being motor units.

2. In a hydrostatic transmission housing, a fluid conveying member having pressure fluid and suction fluid conveying means and also including control valve means associated with said pressure fluid and suction fluid conveying means, each of said control valve means being provided with a sealing surface and having two kidney-shaped cavities, one of said cavities communicating with said pressure fluid conveying means and the other one of said cavities communicating with said suction fluid conveying means, a plurality of hydraulic units of the axial piston type including at least one pump part and at least one motor part and being arranged on one and the same side of said one fluid conveying member while at least another motor part is arranged on the other side of said one fluid conveying member, each one of said units having a swash plate and also having a cylinder block rotatable relative to said fluid conveying member and provided with a plurality of cylinders extending substantially in the direction of the axes of rotation of said cylinder blocks, each cylinder block at the one end opposite the swash plate engaging one of said sealing surfaces, the axes of rotation of said cylinder blocks being substantially parallel to each other and perpendicular to said sealing surfaces of said valve means, a plurality of pistons respectively reciprocable in said cylinders and acting upon the respective swash plate, the plane of each of said swash plates in each respective angular position thereof remaining stationary relative to said fluid conveying member while the respective unit operates at the respective angular position of the respective swash plate, and conduit means in the said one end of each cylinder block extending in axial direction of said cylinders and together with said cavities in response to the rotation of said cylinder blocks alternately establishing communication between said cylinders and said pressure fluid conveying means and between said cylinders and said suction fluid conveying means thereby to connect said units in closed circuits, said conduit means being located within the projection of said cylinders on said fluid conveying member, rotatable shaft means drivingly connected to said cylinder blocks, said shaft means comprising an input shaft connected to the cylinder blocks of the pump part and an output shaft connected to the cylinder blocks of the motor parts.

3. An arrangement according to claim 1, in which said fluid conveying member has cylinder blocks located on both sides thereof.

4. In a hydrostatic transmission housing, a fluid conveying member having pressure fluid and suction fluid conveying means and also including control valve means associated with said pressure fuid and suction fluid conveying means, each of said control valve means being provided with a sealing surface and having two kidney-shaped cavities, one of said cavities communicating with said pressure fluid conveying means and the other one of said cavities communicating with said suction fluid conveying means, at least three hydraulic units of the axial piston type arranged on one and the same side of said one fluid conveying member and including pump and motor parts, each one of said units having a swash plate and also having a cylinder block rotatable relative to said fluid conveying member and provided with a plurality of cylinders extending substantially in the direction of the axes of rotation of said cylinder blocks, said cylinder blocks at their one ends opposite the swash plate ends thereof engaging the said sealing surfaces of said valve means, supporting means respectively associated with said swash plates for rotatably supporting the same and to allow tilting of said swash plates about an axis perpendicular to the respective axis of rotation of the cylinder block pertaining thereto, the tilting axes of said supporting means being stationarily arranged in said transmission housing, the axes of rotation of said cylinder blocks being substantially parallel to each other and perpendicular to said sealing surfaces of said valve means, a plurality of pistons respectively reciprocable in said cylinders and acting upon the respective swash plate, the plane of each swash plate in each respective angular position thereof being stationary relative to said fluid conveying member during the operation of the respective unit at the respective angular position of the respective swash plate, and conduit means in the said one end of each cylinder block extending in axial direction of said cylinders and being operable together with said cavities in response to the rotation of said cylinder blocks to alternately connect said cylinders of said cylinder blocks with said pressure fluid conveying means and said suction fluid conveying means respectively thereby to connect said units in closed circuit, said conduit means being located within the projection of said cylinders on said fluid conveying member, a rotatable input shaft, and a rotatable output shaft, at least the said cylinder blocks of said pump parts being drivingly connected to said input shaft, and the other cylinder blocks of said units constituting the motor parts being drivingly connected to said output shaft.

5. An arrangement according to claim 4, in which the number of cylinder blocks drivingly connected to said output shaft exceeds the number of cylinder blocks drivingly connected to said input shaft.

6. An arrangement according to claim 4, in which said cylinder blocks and the control valve means pertaining thereto are arranged on opposite sides of said fluid conveying member.

7. A hydrostatic transmission according to claim 1, in which said pressure fluid conveying means and said suction fluid conveying means are in the form of substantially straight and parallel conduit means.

8. A hydrostatic transmission according to claim 1, in which said pressure fluid conveying means and said suction fluid conveying means form substantially parallel circular and endless conduit means.

9. In an infinitely variable hydraulic transmission having an input shaft, an output shaft, and a transmission housing: a fluid conveying member having pressure fluid and suction fluid conveying means, at least three hydraulic units of the axial piston type and including pump and motor units, each of said units having shaft means rotatably journalled in said transmission housing, a swash plate, a cylinder block drivingly connected to said shaft means and having a plurality of cylinders therein extending in axial direction of said cylinder block, a plurality of pistons reciprocable in said cylinders and acting upon said swash plate, a plurality of control valves respectively communicating with said cylinders and fixedly arranged on said fluid conveying member, each of said control valves having a sealing surface engaging one end of the respective adjacent cylinder block, the axes of rotation of said cylinder blocks being substantially parallel to each other, the plane of each of said swash plates in each respective angular position thereof being stationary relative to said fluid conveying member during the operation of the respective unit at said respective angular position of the respective swash plate, supporting means respectively associated with said swash plates for rotatably supporting the same, said supporting means being tiltable for tilting said swash plates about axes perpendicular to the respective axis of rotation of said cylinder block pertaining thereto, said cylinder blocks at their one ends opposite the swash plate ends thereof engaging the said sealing surfaces of said valve means, conduit means in said one end of each cylinder block extending in axial direction of said cylinders and in response to the rotation of said cylinder blocks alternately establishing communication between said cylinders and said pressure fluid conveying means and between the cylinders and said suction fluid conveying means thereby to connect said units in closed circuit, said conduits being located within the projection of said cylinders on said fluid conveying member, the said cylinder blocks of said pump units being drivingly connected to said input shaft, and other cylinder blocks of said units being drivingly connected to said output shaft, said last mentioned cylinder blocks being arranged on opposite sides of said fluid conveying member and coaxially with regard to each other.

10. A hydraulic transmission according to claim 9, in which said two coaxially arranged cylinder blocks are directly connected to a common output shaft.

11. In an infinitely variable hydraulic transmission having an input shaft, an output shaft, and a transmission housing: a fluid conveying member having pressure fluid and suction fluid conveying means, at least four hydraulic units of the axial piston type, each of said units having shaft means rotatably journalled in said transmission housing, a swash plate, a cylinder block drivingly connected to said shaft means and having a plurality of cylinders therein extending in axial direction of said cylinder block, a plurality of pistons reciprocable in said cylinders and acting upon said swash plate, a plurality of control valves respectively communicating with said cylinders and fixedly arranged on said fluid conveying member, each of said control valves having a sealing surface engaging one end of the respective adjacent cylinder block, the axes of rotation of said cylinder blocks being substantially parallel to each other, the plane of each of said swash plates in each respective angular position thereof being stationary relative to said fluid conveying member during the operation of the respective unit at said respective angular position of the respective swash plate, supporting means respectively associated with said swash plates for rotatably supporting the same, said supporting means being tiltable for tilting said swash plates about axes perpendicular to the respective axis of rotation of said cylinder block pertaining thereto, said cylinder blocks at their one ends opposite the swash plate ends thereof engaging the said sealing surfaces of said valve means, conduit means in the said one end of each cylinder block extending in axial direction of said cylinders and in response to the rotation of said cylinder blocks alternately establishing communication between said cylinders and said pressure fluid conveying means and between the cylinders and said suction fluid conveying means thereby to connect said units in closed circuit, said conduits being located within the projection of said cylinders on said fluid conveying member, at least two cylinder blocks of said units being drivingly connected to said input shaft and being arranged substantially coaxially on opposite sides of said fluid conveying member, at least two other cylinder blocks of said units being drivingly connected to said output shaft and being arranged coaxially on opposite sides of said fluid conveying member, the units connected to said input shaft constituting pumping units and those connected to said output shaft constituting motor units.

12. In an infinitely variable hydraulic transmission having an input shaft, an output shaft, and a transmission housing: a fluid conveying member having pressure fluid and suction fluid conveying means, at least three hydraulic units of the axial piston type and including pump and motor units, each of said units having shaft means rotatably journalled in said transmission housing, a swash plate, a cylinder block drivingly connected to said shaft means and having a plurality of cylinders therein extending in axial direction of said cylinder block, a plurality of pistons reciprocable in said cylinders and acting upon said swash plate, a plurality of control valves respectively communicating with said cylinders and fixedly arranged on said fluid conveying member, each of said control valves having a sealing surface engaging one end of the respective adjacent cylinder block, the axes of rotation of said cylinder blocks being substantially parallel to each other, the plane of each of said swash plates in each respective angular position thereof being stationary relative to said fluid conveying member during the operation of the respective unit at said respective angular position of the respective swash plate, supporting means respectively associated with said swash plates for rotatably supporting the same, said supporting means being tiltable for tilting said swash plates about axes perpendicular to the respective axis of rotation of said cylinder block pertaining thereto, said cylinder blocks at their one ends opposite the swash plate ends thereof engaging the said sealing surfaces of said valve means, conduit means in the said one end of each cylinder block extending in axial direction of said cylinders and in response to the rotation of said cylinder blocks alternately establishing communication between said cylinders and said pressure fluid conveying means and between said cylinders and said suction fluid conveying means thereby to connect said units in closed circuit, said conduits being located within the projection of said cylinders on said fluid conveying member, at least one of said cylinder blocks being drivingly connected to said input shaft and the unit pertaining thereto constituting a pumping part, and at least two other cylinder blocks of said units being drivingly connected to said output shaft and the units pertaining thereto constituting motor units, said last mentioned cylinder blocks being arranged on opposite sides of said fluid conveying member and coaxially with regard to each other, the number of cylinder blocks drivingly connected to said output shaft exceeding the number of cylinder blocks drivingly connected to said input shaft.

13. An arrangement according to claim 11, in which the cylinder blocks drivingly connected to said output shaft are directly connected thereto.

14. An arrangement according to claim 11, in which the cylinder blocks drivingly connected to said input shaft are directly connected thereto.

15. An arrangement according to claim 1, which includes hydraulic servo motor means operatively connected to said adjusting means for adjusting at least some of said swash plates simultaneously.

16. An arrangement according to claim 1, which includes a central output shaft and in which said cylinder blocks are arranged around said central output shaft.

17. An infinitely variable hydrostatic transmission having an input shaft, an output shaft, a stationary housing, a pump part drivingly connected to the input shaft, a motor part drivingly connected to the output shaft, the pump and motor parts together comprising at least three hydraulic units of the axial piston type hydraulically interconnected in a closed fluid circuit for cooperatively transmitting power from the input shaft to the output shaft; each of said units having shaft means rotatably journalled in said transmission housing and connected to the pertaining one of said input and output shafts, a skew disc, a cylinder block drivingly connected to the pertaining said shaft means for rotation therewith and provided with a plurality of cylinders extending substantially in the direction of the axis of rotation of said cylinder block, a plurality of pistons reciprocable in said cylinders and acting upon said skew disc, a control valve communicating with said cylinders and fixedly arranged on one single fluid conveying member common to all of said units and having pressure and suction conduit means therein for hydraulically connecting the respective control valves in parallel to each other, the said fluid conveying member being arranged stationarily with regard to said transmission housing; all shaft means of said cylinder block being arranged parallel to each other; stud means pivotally supporting said skew discs; said skew discs respectively being adjustable about the axes of said stud means; said axes being stationarily arranged with regard to the transmission housing and being substantially perpendicular to the respective axis of rotation of the cylinder block pertaining thereto; said stationary fluid conveying member being common to all of said control valves; each of said control valves having a sealing surface engaging one end of the adjacent cylinder block; the sealing surface of all of said control valves being arranged in planes parallel to each other and perpendicular to the axes of said shaft means; each control valve having two kidney-shaped cavities; one of said cavities communicating with said pressure conduit means while the other one of said cavities is communicating with said suction conduit means; said cavities controlling the fluid flow to and from the respective cylinders of said cylinder block in axial direction through passages on the control side of each cylinder; at least one cylinder block of said units pertaining to the pump part and being drivingly connected to said input shaft and at least two other cylinder blocks of said units pertaining to the motor part and being drivingly connected to said output shaft; the number of cylinder blocks drivingly connected to said output shaft exceeding the number of cylinder blocks drivingly connected to said input shaft.

18. A hydrostatic transmission according to claim 17, in which all of the cylinder blocks are located on one side only of said fluid conveying member.

19. A hydrostatic transmission according to claim 17, in which the cylinder blocks are located on both sides of said common fluid conveying member.

20. A hydrostatic transmission according to claim 17, in which one of said cylinder blocks pertaining to the pump part is drivingly connected to the input shaft and with its respective control valve is arranged on one side of the common fluid conveying member, whereas two cylinder blocks of said units pertaining to the motor part are drivingly connected to said output shaft and arranged with their respective control valves coaxially to each other on opposite sides of the common fluid conveying member, the respective control valves pertaining thereto being double faced and the respective kidney-shaped cavities communicating with each other.

21. A hydrostatic transmission according to claim 20, in which said two coaxially arranged cylinder blocks are directly connected with the common output shaft.

22. A hydrostatic transmission according to claim 17, in which the cylinder blocks drivingly connected to the input shaft as well as the cylinder blocks drivingly connected to the output shaft are with their respective control valves arranged coaxially to each other on opposite sides of said common fluid conveying member, the respective control valves pertaining to the coaxial cylinder blocks being double faced, and the respective kidney-shaped cavities communicating with each other.

23. A hydrostatic transmission according to claim 22, in which two cylinder blocks drivingly connected to the output shaft are directy connected thereto.

24. A hydrostatic transmission according to claim 22, in which the cylinder blocks drivingly connected to the input shaft are directly connected thereto.

References Cited in the file of this patent
UNITED STATES PATENTS

| | | |
|---|---|---|
| 2,891,419 | Badalini | June 23, 1959 |
| 2,907,230 | Kollmann | Oct. 6, 1959 |
| 2,962,915 | Wiggermann | Dec. 6, 1960 |